United States Patent Office 3,654,341
Patented Apr. 4, 1972

3,654,341
CERTAIN DIFLUORAMINO NITRILE DERIVATIVES
Robert J. Koshar, Lincoln Township, Washington County, Minn., assignor to Minnesota Mining and Manufacturing Company, St. Paul, Minn.
No Drawing. Filed Aug. 5, 1963, Ser. No. 300,956
Int. Cl. C07c 121/42
U.S. Cl. 260—465.5 R
15 Claims This invention relates to fluorinated oxidants and more particularly to certain new nitrile-substituted oxidant compounds.

Fluorinated organic compounds containing several difluoramino groups are known, and some of these are powerful oxidants useful in propellant and explosive compositions. So far as is known, however, compounds containing 2 or more difluoramino groups and a nitrile group or one difluoramino group and two nitrile groups attached to the same carbon atom, have not been heretofore known.

It is an object of this invention to produce fluorinated oxidants containing chiefly carbon, nitrogen and fluorine.

A further object of the invention is to provide fluorinated oxidant compounds containing one or more nitrile groups.

Other objects of the invention will be apparent from the disclosures hereinafter made.

The compounds of the invention are strongly oxidizing materials which are characterized by having relatively low vapor pressures at ordinary temperatures. Thus, they can be employed as storable oxidants for propellant systems. They are powerful oxidizing compounds because they contain fluorinated amino groups attached to carbon. They also contain one or more chemically reactive nitrile groups.

Generally speaking, the compounds of the invention are produced by fluorination of novel intermediate adducts, of the type of those represented by the following formula:

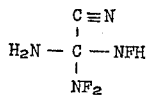

The intermediate adducts are produced by the action of ammonia or its equivalent on e.g. perfluorocyanoformamidine, represented by the formula:

or on fluoriminomalononitrile having the formula:

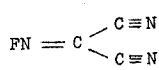

The reaction may be illustrated by the following equation:

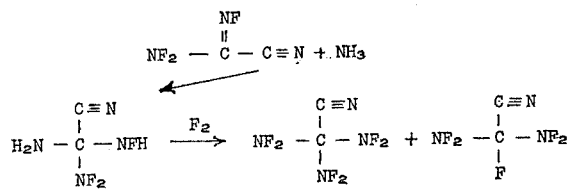

The compounds of the invention are characterized by containing the functional groups:

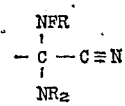

and

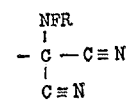

wherein R is fluorine and hydrogen.

The fluoramino moieties of these groups are oxidizing in nature, while the nitrile moieties undergo chemical reactions characteristic of these groups.

Thus the nitrile groups will react with active hydrogen-containing compounds in the usual way, e.g., they will react with ammonia to form amidines, with water to form amides and carboxyl groups, with alcohols to form imino esters. Reaction with hydrazine forms the hydrazidine, which on hydrolysis forms the hydrazide. The carboxyl groups can undergo further reaction to form esters and salts.

The amidines when fluorinated produce powerful new oxidant compounds having additional fluoramino groups. Under mild conditions, stepwise selective fluorination of —NH$_2$ and —NFH groups in any of the products to —NF$_2$ groups occurs, and under more vigorous conditions, stepwise fluorination of —C≡N to —CF=NF and —CF$_2$NF$_2$ groups takes place.

Because the compounds of the invention contain fluoramino groups, and nitrile groups, they are characterized by having an infrared absorption spectrum containing absorption bands between 10 and 11 microns, corresponding to the NF bonds, and a peak at about 4.4 microns corresponding to the —C≡N group. Compounds containing numerous —NF bonds have extremely strong oxidizing power and are shock sensitive.

The intermediate adducts are likewise shock sensitive materials, which are relatively stable at temperatures below about —50° C. They are viscous oils of low vapor pressure which decompose before they boil. Preferred intermediates are those which are produced by the reaction of ammonia with perfluorocyanoformamidine and fluoriminomalononitrile, and their preparation is described hereinafter.

The fluorinated compounds from which the above-named intermediates are prepared are produced by direct fluorination of ammeline, to produce perfluoroguanidine and related fluorimino compounds. This method is described more fully in the copending application for U.S. Letters Patent of Koshar and Husted, S.N. 99,632, filed Mar. 30, 1961, now U.S. Pat. No. 3,461,162.

In preparing the adducts, the reaction of the ammonia with the fluoroimino compound is carried out at low temperatures of the order of about —110 to —20° C., in a solvent such as dimethyl ether and under essentially anhydrous conditions. The adduct is then isolated by evaporating the solvent and any low-boiling concomitants at low temperatures of the order of about —100 to —20° C. The concentrated adduct is then fluorinated with or without solvents such as acetonitrile by treating directly with fluorine at temperatures in the range of about —80 to +50° C., preferably not above +25° C. A mixture of products is obtained from which the desired end product of the invention is recovered, as by gas-liquid chromatography.

Because of their extremely strong oxidizing power and their shock sensitivity, it is necessary that the compounds of the invention and the intermediate compounds as well as the starting materials be handled with caution. Manipulation of the compounds as well as the conduct of the reatcions call for extreme care and precautions to prevent injury in the event of explosion.

The fluorinated oxidant derivatives of the invention are useful as such in explosive and liquid and solid propellant compositions. They can be ignited as by means of a squib or exploded with a cartridge. Propellant compositions containing the higher-boiling compounds of the invention, combined with fuel such as lithium or boron and optionally with an additional oxidizer such as ammonium perchlorate to consume any carbon present, such as that in any organic binder used, burn with intense heat and the formation of large volumes of gases.

The compounds of the invention are also very useful as intermediates in the preparation of other —NF group-containing oxidant compounds including liquid and solid materials, by reactions of the nitrile groups.

It will be apparent from the broad disclosure set forth herein that the invention comprehends within its scope fluorinated oxidant compounds containing at least one functional group consisting of a carbon atom three valence bonds of which are substituted by nitrile, fluorimino, amino and fluoramino groups, at least one and not more than two nitrile groups being present and when two nitrile groups are present the third valence bond being substituted by a fluoramino group, the fourth valence bond of the said carbon atom being attached to the remainder of the said oxidant compound. "Fluoramino" groups include both mono- and di-fluorinated amino nitrogen, as distinguished from fluorimino groups in which two of the valence bonds of the nitrogen atom are attached to the same carbon atoms.

A preferred group of compounds included within the scope of the invention is represented by compounds having the formula:

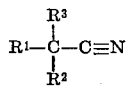

in wihch $R^1$ is a member of the group consisting of —F, —$NF_2$ and —C≡N; $R^2$ is a member of the group consisting of —$NH_2$, —NFH and —$NF_2$; $R^3$ is a member of the group consisting of —NFH and —$NF_2$; when $R^1$ is —C≡N, $R^3$ taken together with $R^2$ is additionally =NF; and when $R^3$ is —$NF_2$, $R^2$ is selected from the group consisting of —$NH_2$ and —$NF_2$.

The following examples will more specifically illustrate the preparation of the compounds of the invention and their properties.

EXAMPLE 1

Preparation of perfluorocyanoformamidine

About 0.9 millimole of essentially anhydrous hydrogen cyanide and 0.6 millimole of perfluoroguanidine are charged under vacuum into a two ml. borosilicate glass reactor which is cooled to about —110° C. and contains an anhydrous mixture of 0.13 ml. of acetonitrile, 0.02 ml. of trichlorofluoromethane and 0.002 g. of potassium cyanide. The reactor is fitted with a Fischer and Porter Teflon needle valve and a gas inlet. The reactor is closed and allowed to warm gradually from —110 to 0° C. over a period of 15 hours and then up to about 25° C. over a period of one hour. The components of the reaction mixture are separated by gas-liquid chromatography at 0° C. employing a three meter column, composed of about 33% by weight of perfluorinated amine (available commercially under the trade name FC–43) on diatomaceous earth available under the trade name Chromasorb P. About 0.3 millimole of one of the isomers of perfluorocyanoformamidine (isomer A: syn or anti form) is isolated. The relative retention value (TR) of this isomer of perfluorocyanoformamidine is about 69 with respect to trichlorofluoromethane as a reference of 100. The relative retention values (TR) are obtained by the equation:

$$TR = \frac{Tr \text{ (component)} - Tr \text{ (air)}}{Tr \text{ (reference)} - Tr \text{ (air)}} \times 100$$

where $Tr$ is the actual retention in minutes.

Perfluorocyanoformamidine (isomer A) boils at about 20° C. and is identified by its molecular weight (calculated for $C_2F_3N_3$, 123: found, 125) as well as infrared, fluorine nuclear magnetic resonance and by mass spectroscopy. Its infrared spectrum exhibits an absorption for —C≡N at 4.44$\mu$, >C=N— (very weak) at 6.14$\mu$ and strong absorptions at 10.65$\mu$ and 11.26$\mu$ in the region expected for NF and $NF_2$. Its fluorine nuclear magnetic resonance spectrum shows peaks at —56.8$\phi$ ($NF_2$) and —50.8$\phi$ (NF) in the area ratio of about 2 to 1, respectively.

Perfluorocyanoformamidine is also identified by mass spectroscopy using a Consolidated Electrodynamics Corporation Mass Spectrometer, Type 21–103C. Some of the important mass peaks (m/e) correspond to the fragments, $C_2N_3F_2^+$, $C_2N_3F^+$, $C_2N_2F^+$, $NF_2^+$ or $C_2N_2^+$ $C_2N^+$, $NF^+$, $CF^+$ and $CN^+$.

The following elemental analyses were obtained: Calculated for $C_2F_3N_3$ (percent): C 19.5; F, 46.3; N, 34.1. Found (percent): C, 19.1; F, 44.8; N, 30.4.

EXAMPLE 2

Preparation of tris(difluoramino)acetonitrile

A gaseous mixture of about 0.8 millimole of ammonia and 8.7 millimoles of dimethyl ether is charged intermittently under vacuum over a period of 10 minutes into a 6 ml. borosilicate glass reactor which is cooled to about —110° C. (slush bath of trichlorofluoromethane and liquid nitrogen) and contains a stirred solution of 0.9 millimole of $F_2NC$(=NF)CN (isomer A) and 0.5 ml. of dimethyl ether. The reactor is equipped with a Fischer and Porter Teflon needle valve and a gas inlet at the top and contains a Teflon coated bar magnet. The mixture is stirred at about —110° C. for about 40 minutes and then stored at —78° C. for about 15 hours.

The reaction mixture is then allowed to warm to about —63° C. (slush bath of chloroform and liquid nitrogen) and most of the dimethyl ether is stripped off under vacuum until the residue which remains has a vapor pressure of less than about one millimeter at —63° C. The residue which appears to be liquid contains the adduct,

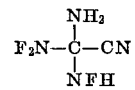

and a small amount of dimethyl ether.

The reactor containing the adduct is again cooled to —110° C., and charged under vacuum with about 2 ml. of dry acetonitrile. The resulting mixture is allowed to warm to —40° C. (slush bath of $CHCl_3$, $CCl_4$ and liquid nitrogen) until it becomes fluid; the reactor is then filled with an atmosphere of nitrogen and stored at —40° C. for a period of about one hour.

The Teflon needle valve of the reactor is replaced with a fluorine gas inlet tube which is immersed into the acetonitrile solution. The reactor is equipped with a gas exit line which is connected to a borosilicate glass trap cooled with liquid oxygen. The other end of the trap is connected to a vent line. Fluorination of the adduct is carried out at about —35° C. (bath) using 3% by volume of fluorine diluted with nitrogen which is premixed and metered at a substantially constant rate from a three liter Hoke cylinder (initial pressure of 150 p.s.i.g.). After 6.5 hours, a total of about 30 millimoles of fluorine is used. The cylinder pressure drop is about 100 p.s.i.g.

The more volatile fluorination products are collected in the borosilicate glass trap and some of the products which contain —NFH and —NH$_2$ groups remain in the reactor. The material in the cold trap is a mixture of tris-(difluoramino)acetonitrile and other fluorination products as well as acetonitrile and dimethyl ether.

The tris(difluoramino)acetonitrile formed is isolated by gas-liquid chromatography at about 25° C. employing a six meter, ½-inch column composed of 33% by weight of Kel-F Polymer Oil, Grade KF–8126 on Chromasorb P. The retention value (TR) of tris(difluoramino)acetonitrile is about 117 when trichlorofluoromethane is used as a reference of 100.

Tris(difluoramino)acetonitrile is identified by its characteristic infrared, fluorine, nuclear magnetic resonance and mass spectra. The following analyses were obtained:

| | $\phi$(CFCl$_3$ as reference) | Assignment |
|---|---|---|
| Fluorine n.m.r. spectrum | −39.3 (broad symmetrical peak). | NF$_2$ |

| | $\mu$ | |
|---|---|---|
| Infrared spectrum, (major absorptions) | 4.42 (m) | —C≡N |
| | 10.34 (s) | |
| | 10.58 (vs) | —NF$_2$ |
| | 10.99 (vs) | |

NOTE:
Mass spectrum=Consistent with the structure. Some of the prominent mass peaks (m/e) corresponded to the fragments C$_2$F$_4$N$_3$$^+$, C$_2$F$_2$N$_2$$^+$, C$_2$F$_2$N$_2$$^+$, NF$_2$$^+$.
Molecular weight=Calculated for C$_2$F$_6$N$_4$: 194. Found (percent): 187.

EXAMPLE 3

Preparation of bis(difluoramino)fluoroacetonitrile and related compounds

The addition of ammonia to perfluorocyanoformamidine is carried out under conditions similar to those described in Example 2. A gaseous mixture of about 0.6 millimole of ammonia and 8.5 millimoles of dimethyl ether is allowed to react with 0.7 millimole of perfluorocyanoformamidine in 0.5 ml. of dimethyl ether at −110° C. over a period of about one hour. The dimethyl ether is removed under vacuum at −63° C. until the vapor pressure of the residue (partly solid) is less than about one millimeter Hg at −63° C. The residue which contains the adduct,

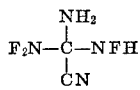

is stored at −78° C. under nitrogen over a period of 15 hours prior to its fluorination.

The reactor which contains the adduct is then fitted with a fluorine gas inlet and a gas exit line which is connected in series to an iron pipe which is at about 25° C. and contains sodium fluoride pellets, two liquid-oxygen cooled borosilicate glass traps and a vent line. Fluorination of the adduct is carried out at about −40° to −30° C. (bath temperature) using 3% by volume of fluorine diluted with nitrogen. The fluorine is premixed with nitrogen and supplied from a 2.3 liter Hoke cylinder having an initial pressure of 150 p.s.i.g. A total of about 25 millimoles of fluorine is used over a period of three hours. After the completion of the fluorination, the reactor is allowed to warm to about −20° C. and is flushed with nitrogen for one hour.

The two traps contain a total of about 0.6 millimole of product which is separated into its various components by gas-liquid chromatography using the column described in Example 2. At least eleven components are indicated. Some of the components which are isolated are bis(difluoramino) fluoroacetonitrile (TR, 33), perfluorocyanoformamidine (isomer A; TR, 42), perfluorocyanoformamidine (isomer B; TR, 56), 1,1-bis(difluoramino)-2-fluoriminodifluoroethane (TR, 80) and 1,1,2-tris(difluoramino)-trifluoroethane (TR, 98). The TR values are obtained by using trichlorofluoromethane as the reference of 100.

Bis(difluoroamino)fluoroacetonitrile is characterized by its molecular weight (calculated for C$_2$F$_5$N$_3$, 161; found, 164), as well as its infrared, fluorine nuclear magnetic resonance and mass spectra. Its infrared spectrum exhibits absorptions at 4.40$\mu$ (—C≡N), 8.04$\mu$ (CF region), and strong absorptions at 10.48$\mu$ and 11.02$\mu$ in the region expected for NF$_2$.

Its nuclear magnetic resonance spectrum shows peaks at −30.7$\phi$ (—NF$_2$) and +133.4$\phi$ (>CF—) in the correct area ratio. Mass spectroscopy gives mass peaks (m/e) which correspond to the fragments, C$_2$F$_3$N$_2$$^+$, C$_2$F$_2$N$_2$$^+$, C$_2$F$_2$N$^+$, C$_2$FN$_2$$^+$, CF$_3$$^+$, CF$_2$N$^+$, C$_2$FN$^+$, NF$_2$$^+$, CFN$^+$, NF$^+$, CF$^+$ and CN$^+$.

Perfluorocyanoformamide (isomer B; syn or anti form) can be differentiated from isomer A by infrared and fluorine nuclear magnetic resonance spectroscopy. Its infrared spectrum exhibits absorptions at 4.40$\mu$ (—C≡N), 6.25$\mu$ (very weak >C=N—) and strong absorptions at 10.20$\mu$ and 11.24$\mu$ in the —NF and —NF$_2$ region. Its fluorine nuclear magnetic resonance spectrum shows peaks at −51.1$\phi$ (—NF$_2$) and −53.0$\phi$ (NF). Its molecular weight is found to be 123 (calculated for C$_2$F$_3$N$_3$, 123).

The infrared spectrum of 1,1-bis(difluoramino)-2-fluoriminodifluoroethane shows prominent absorptions at 8.1$\mu$ (CF region) as well as at 10.6$\mu$ and 11.1$\mu$ in the regions expected for NF and NF$_2$ groups. The molecular weight of 203 was found (calculated for C$_2$N$_3$F$_7$, 199). Its mass spectrum shows mass peaks (m/e) which correspond to the fragments, C$_2$N$_2$F$_5$$^+$, C$_2$N$_2$F$_4$$^+$, CNF$_3$$^+$, CNF$_2$$^+$, NF$^+$ and CF$^+$.

1,1,2-tris(difluoramino) trifluoroethane is identified by its molecular weight (calculated for C$_2$N$_3$F$_9$, 237; found, 239) as well as by infrared and mass spectroscopy. Its infrared spectrum exhibits strong absorptions at 7.95$\mu$ and 8.20$\mu$ (CF and CF$_2$ regions) and in the region of NF$_2$ at about 10.3$\mu$, 10.4$\mu$, 10.6$\mu$ and 10.9$\mu$. Its mass spectrum gives mass peaks (m/e) which correspond to the fragments, C$_2$N$_2$F$_7$$^+$, C$_2$NF$_4$$^+$, CF$_3$$^+$, NF$_2$$^+$ and CF$^+$.

EXAMPLE 4

Preparation of fluoriminomalononitrile

Into a reactor similar to that described in Example 1 is charged 0.002 g. of potassium cyanide and 0.08 ml. of acetonitrile. The reactor is cooled to about −110° C. and charged under vacuum with 0.4 millimole of perfluorocyanoformamidine and 0.8 millimole of essentially anhydrous hydrogen cyanide. The reactor is closed and allowed to warm gradually from −110° C. to about 25° C. over a period of 15 hours and then maintained at about 25° C. for three days.

The reaction mixture is passed serially through three borosilicate glass traps cooled respectively to about −63°, −140° and −196° C. The −196° C. cooled trap is evacuated to a pressure of less than one mm. Hg during this process.

Chromatographic separation of the components of the −63° C. cooled trap using the column described in Example 2 yields fluoriminomalononitrile which contains some acetonitrile.

The average molecular weight found for fluoriminomalononitrile (F—N=C(CN)$_2$) was about 98 (calculated for C$_3$FN$_3$, 97). Its infrared spectrum exhibits prominent absorptions at 4.43$\mu$ (—C≡N) and a strong absorption at 10.17$\mu$ in the NF region. The fluorine nuclear magnetic resonance spectrum exhibits a peak at −86.7$\phi$ (NF). Its mass spectrum shows mass peaks (m/e) which correspond to the cations, C$_3$FN$_3$$^+$ (parent peak), C$_3$N$_3$$^+$, C$_2$N$_2$$^+$, CFN$^+$ and CN$^+$.

EXAMPLE 5

Preparation of bis(difluoramino)malononitrile and related compounds

Under conditions similar to those described in Example 2, a gaseous mixture of about 0.5 millimole of ammonia and 7.5 millimoles of dimethyl ether is allowed to react at about —110° C. with 0.4 millimole of fluoriminomalononitrile in 0.5 cc. of dimethyl ether. Dimethyl ether is removed at —63° C. under vacuum to yield a residue which contains the adduct,

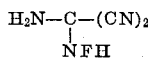

along with some dimethyl ether. The aduct is diluted with about 2 ml. of acetonitrile and is fluorinated under conditions similar to those described in Example 2.

Chromatographic separation of the fluorination products under conditions described in Example 2 yields bis(difluoramino)malononitrile, $(F_2N)_2C(CN)_2$, and difluoraminofluoromalononitrile, $F_2NCF(CN)_2$, as well as other compounds. These compounds are identified by their infrared, nuclear magnetic resonance and mass spectra.

EXAMPLE 6

Preparation of the amidine derivative of bis-(difluoramino)fluoroacetonitrile

A two ml. borosilicate glass reactor fitted with a Fischer Porter Teflon needle valve is evacuated, cooled to —110° C. and charged with 0.1 ml. of dimethyl ether, 0.015 ml. of trichlorofluoromethane, 0.17 millimole of bis(difluoramino)fluoroacetonitrile and 0.33 millimole of ammonia. The reactor valve is closed and the mixture allowed to warm gradually to 0° over a period of 15 hours. The mixture is then kept at room temperature for about four hours.

After the removal of solvent and excess ammonia, a residue which is a mixture of solids and a viscous oil is isolated. The vapor pressure of the residue is less than about <1 mm. Hg at 23° C. Extraction of the residue with diethyl ether gives an ether-soluble, viscous yellow oil (vapor pressure of about 1 mm. at 25° C.) which is identified as the amidine,

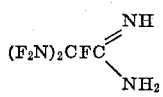

Its fluorine nuclear magnetic resonance spectrum exhibits peaks at —23.7φ ($NF_2$) and 156φ (CF) in the correct area ratio. Prominent infrared absorptions are found at about 5.93μ (>C=N—) as well as at 10.72μ and 11.26μ in the region expected for the —$NF_2$ groups.

EXAMPLE 7

Preparation of fluorimino fluoroacetonitrile

By the procedure of Example 1 perfluoromethyleneimine, anhydrous hydrogen cyanide and potassium cyanide are reacted to form

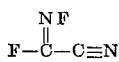

The compound is obtained in sufficient purity for the preparation of adducts and subsequent fluorination.

EXAMPLE 8

Preparation of bis(difluoramino)fluoroacetonitrile and related compounds

By the procedure of Example 2,

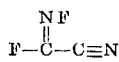

and anhydrous ammonia are reacted to form

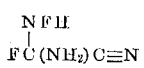

and this concentrated adduct is fluorinated under mild conditions in acetonitrile to form a mixture of

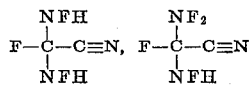

and

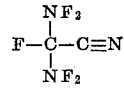

These products are isolated and separated by liquid-gas chromatography and identified by their infrared and fluorine N.M.R. spectra.

What is claimed is:

1. A fluorinated oxidant compound containing a functional group consisting of a carbon atom, three valence bonds of which are substituted by members of the group consisting of nitrile, fluorimino, amino, and fluoramino groups, at least one and not more than two nitrile groups being present and when two nitrile groups are present the third valence bond being substituted by a fluoramino group, the fourth valence bond of the said carbon atom being attached to the remainder of the said oxidant compound, said remainder being compatible with nitrile and fluoramino groups, and provided that when the said carbon atom is bonded to a fluorimino group the said remainder of the oxidant compound is a nitrile group.

2. A compound of the formula

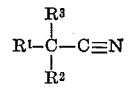

in which $R^1$ is a member of the group consisting of —F, —$NF_2$ and —C≡N; $R^2$ is a member of the group consisting of —$NH_2$, —NFH and —$NF_2$; $R^3$ is a member of the group consisting of —NFH and —$NF_2$, and when $R^1$ is —C≡N, $R^3$ taken together with $R^2$ is additionally =NF; and when $R^3$ is —$NF_2$, $R^2$ is selected from the group consisting of —$NH_2$ and —$NF_2$.

3. A nitrile-group derivative of a compound of the formula

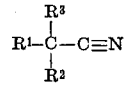

in which $R^1$ is a member of the group consisting of —F, —$NF_2$ and —C≡N; $R^2$ is a member of the group consisting of —$NH_2$, —NFH and —$NF_2$; $R^3$ is a member of the group consisting of —NFH and —$NF_2$, and when $R^1$ is —O≡N, $R^3$ taken together with $R^2$ is additionally =NF; and when $R^3$ is —$NF_2$, $R^2$ is selected from the group consisting of —$NH_2$ and —$NF_2$.

4. An amidine derivative of a compound of the formula

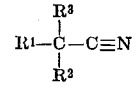

in which $R^1$ is a member of the group consisting of —F, —$NF_2$ and —C≡N; $R^2$ is a member of the group consisting of —$NH_2$, —NFH and —$NF_2$; $R^3$ is a member of the group consisting of —NFH and —$NF_2$, and when $R^1$ is —C≡N, $R^3$ taken together with $R^2$ is additionally =NF; and when $R^3$ is —$NF_2$, $R^2$ is selected from the group consisting of —$NH_2$ and —$NF_2$.

5. Tris (difluoramino) acetonitrile of the formula $(NF_2)_3CC≡N$.

6. Bis (difluoramino) fluoroacetonitrile of the formula $(NF_2)_2CFC≡N$.

7. Fuoriminomalononitrile of the formula

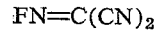

8. Amino-difluoramino-monofluoraminoacetonitrile of the formula $$NH_2-\underset{NF_2}{\overset{NFH}{C}}-C\equiv N$$

9. Difluoramino-bis(monofluoramino) acetonitrile of the formula $$(NFH)_2\underset{}{\overset{NF_2}{C}}-C\equiv N$$

10. Bis(difluoramino)-monofluoraminoacetonitrile of the formula $$(NF_2)_2\overset{NFH}{C}-C\equiv N$$

11. Bis(difluoramino) malononitrile of the formula $$(NF_2)_2C(CN)_2$$

12. Amino-fluoraminomalononitrile of the formula $$NH_2-\overset{NFH}{C}(CN)_2$$

13. 1,1 - bis(difluoramino) - 2 - fluoriminodifluoroethane of the formula $$(NF_2)_2CFCF=NF$$

14. 1,1,2-tris(difluoramino)trifluoroethane of the formula $$(NF_2)_2CFCF_2NF_2$$

15. Difluoraminofluoromalononitrile of the formula $$NF_2\overset{F}{C}(CN)_2$$

References Cited
UNITED STATES PATENTS
3,114,763  12/1963  Josey _____ 260—464
3,440,271  4/1969  Engel _____ 260—465.5

LELAND A. SEBASTIAN, Primary Examiner

U.S. Cl. X.R.
149—109; 260—583 NH